April 2, 1940.   I. L. CLIFFORD   2,195,917
MANUFACTURE OF SODIUM HYDROXIDE FROM SODIUM CHLORIDE
Filed Oct. 20, 1936
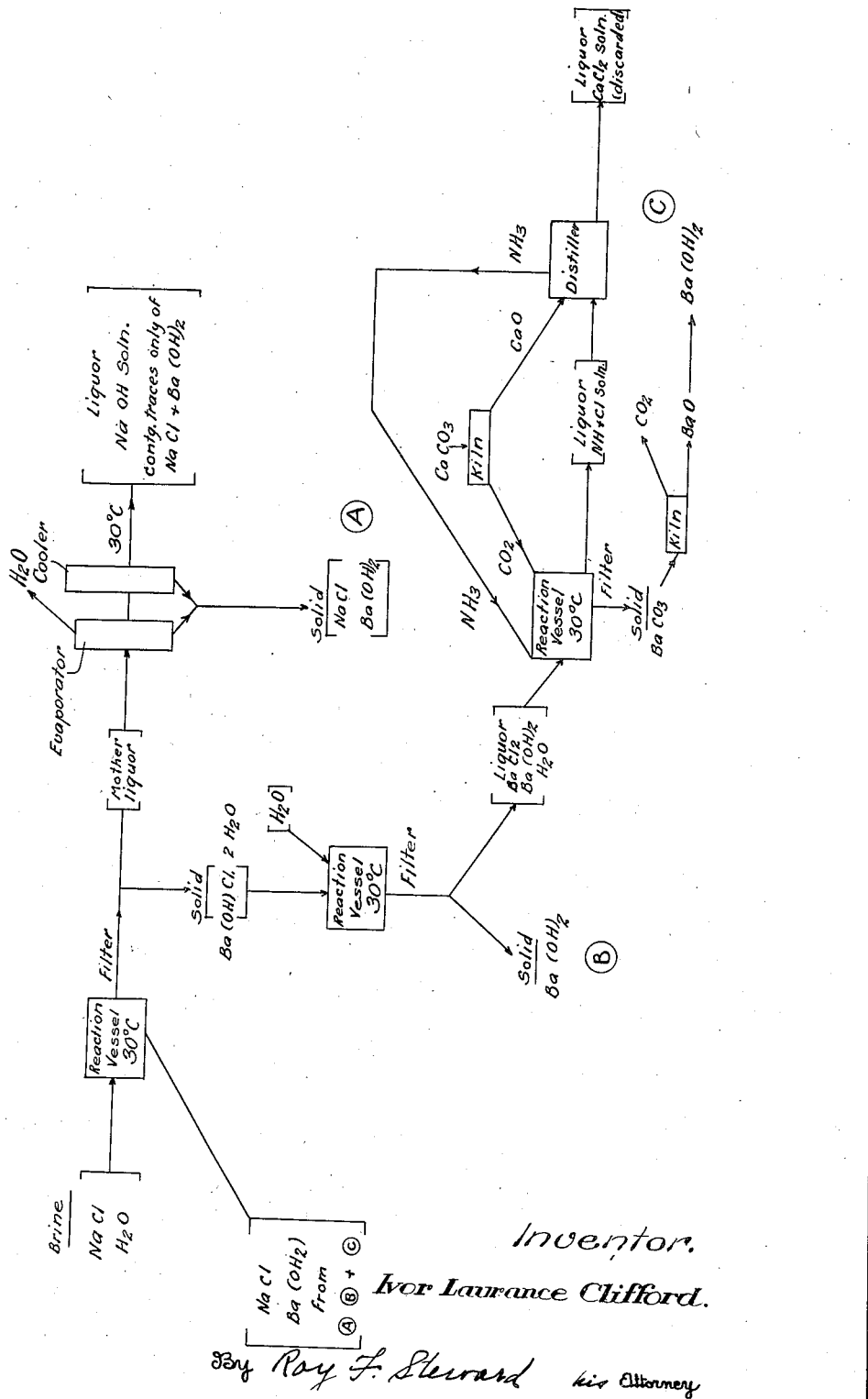
Inventor.
Ivor Laurance Clifford.
By Roy F. Steward his Attorney Patented Apr. 2, 1940

2,195,917

UNITED STATES PATENT OFFICE 2,195,917

MANUFACTURE OF SODIUM HYDROXIDE FROM SODIUM CHLORIDE

Ivor Laurance Clifford, Northwich, England, assignor to Imperial Chemical Industries Limited, a corporation of Great Britain Application October 20, 1936, Serial No. 106,696
In Great Britain October 24, 1935

16 Claims. (Cl. 23—185)

This invention relates to the manufacture of sodium hydroxide from sodium chloride.

For the purpose of aiding in disclosing the invention, a flow diagram illustrating a desirable practical embodiment of the invention is given in the accompanying drawing, which will be readily understood in view of the description hereinafter set forth.

An addition compound of the formula $$BaO.BaCl_2.5H_2O$$

is, as such, known, which compound may also be written under the formula $Ba(OH)Cl.2H_2O$, and is hereinafter referred to as basic barium chloride. Also it has been stated by Schreinemakers (Zeitsch. phys. Chem., vol. 68, pp. 90–93, 1910) that the solid phases capable of existing in the system made up of the components $H_2O$, $BaO$, $Na_2O$, $BaCl_2$, $NaCl$, at 30° C. are $NaOH.H_2O$; $BaO.2H_2O$; $BaO.4H_2O$; $BaO.9H_2O$;

$$BaCl(OH).2H_2O;$$

$BaCl_2.2H_2O$; and NaCl. Schreinemakers considered this system to be a quaternary one, being of the opinion that a reaction $$2NaCl+BaO=BaCl_2+Na_2O$$

would occur therein. Schreinemakers' paper suggests therefore that reacting $Ba(OH)_2$ and NaCl would yield $BaCl_2$.

Applicant has found, however, that NaCl and BaO can be reacted according to the equation $$2NaCl+Ba(OH)_2+4H_2O=\\2NaOH+BaO.BaCl_2.5H_2O$$

and that this reaction goes on effectively at temperatures not exceeding 40° C.; whereas, under the same conditions, there is no significant production of other alkali metal hydroxides by reaction between other alkali metal chlorides and BaO.

According to the invention, the manufacture of sodium hydroxide from sodium chloride is effected by a process which comprises the following essential steps:

(1) Reaction between sodium chloride and barium hydroxide in aqueous medium at a temperature not exceeding 40° C., to form solid basic barium chloride, which is removed from the reaction mixture;

(2) Evaporation, with or without carbonation or sulphation, of the mother liquor from step (1) to remove as solids the relatively small barium content and practically all of the sodium chloride content of the liquor.

The resulting solution consists of sodium hydroxide relatively poor in sodium chloride and if desired may be further purified by known methods, e. g., by treatment with sodium sulphate (or sulphuric acid) or with sodium sulphate and carbonate, and if desired the crude or purified solution may be worked up for solid sodium hydroxide.

Suitable aqueous media for use in step (1) include water, mixtures of water with suitable miscible liquids, e. g., alcohols and solutions of suitable salts or alkaline substances (including gases such as ammonia) in the same. In suitable methanol-water mixtures it is possible to obtain higher concentrations of sodium hydroxide, and lower concentrations of sodium chloride and barium ion, in the mother liquor from step (1) than if water alone is used as the reaction medium. Such a methanol-water mixture may be obtained by incorporating the barium hydroxide in a hydrated form, e. g., $Ba(OH)_2.8H_2O$, in methanol. The barium hydroxide may be added in step (1) wholly or in part, as barium oxide which is hydrated by the aqueous reaction medium.

In step (2), instead of evaporation alone, a combination of evaporation followed by cooling, or flash evaporation, which results in cooling, may be employed, if desired in two or more stages with intermediate separation of the solids. Carbonation or sulphation may be effected before, during or after evaporation.

(By carbonation or sulphation is to be understood the introduction of carbonate or sulphate ion in any suitable manner with the primary object of more completely precipitating the barium content of the liquor.)

The mother liquor from step (1) may be treated to recover separately the barium content and the sodium chloride content, the latter being suitably returned to the process. The barium content may also be returned to the process after conversion to barium oxide or hydroxide. Thus the mother liquor from step (1) may be carbonated prior to evaporation, the resulting barium carbonate being calcined and returned to the process as barium oxide or hydroxide. Alternatively, the mother liquor from step (1) may be evaporated to recover the bulk of the barium content in the form of a mixture of barium hydroxide and sodium chloride, which is returned to the process.

To improve the economy of the process it is preferable to convert at least part of the basic barium chloride obtained in step (1) into barium oxide or hydroxide, which is returned to the process.

According to one suitable method, the basic barium chloride is converted, at least in part, into solid barium hydroxide by treatment with water or aqueous ammonia, whereby the basic chloride is split up into barium hydroxide, the bulk of which is obtained undissolved, and barium chloride, which is dissolved. More complete conversion of the basic chloride is obtainable by carbonating the residual liquor, whether non-ammoniacal or ammoniacal; in the latter case (and if not already ammoniacal, the liquor may be made so, or an ammonium carbonate may be employed for the carbonation) substantially complete conversion may be obtained. The barium carbonate so precipitated is calcined, and returned as barium oxide or hydroxide to the reaction. In this way practically the whole of the barium hydroxide employed in the reaction may be rendered available for re-use. Whether the whole of it or only a portion of it is recovered for re-use will depend upon the economic conditions prevailing at the place of manufacture.

Our process for the manufacture of caustic soda can thus be conducted as a cyclic, or substantially cyclic, operation.

The invention is illustrated, but not limited, by the following examples; the parts are by weight.

EXAMPLE 1

*Step (1)*

Into a stirred reaction vessel at 30° C. are introduced 4150 parts of $Ba(OH)_2$ as one of its hydrates, made up of 120 parts of $Ba(OH)_2$ recovered from the mother liquor from this step, 1400 parts recovered from part (a) of step (3) and 2630 parts recovered from part (b) of step (3), 3140 parts of NaCl made up of 1720 parts of NaCl recovered from step (2) and 1420 parts of NaCl introduced as brine, and 7870 parts of water, which are added partly as brine and partly as water of crystallisation with the $Ba(OH)_2$. A portion of the total $Ba(OH)_2$ may be added as BaO, hydration being effected in situ. From the vessel are removed, after a sufficient period of time to enable equilibrium to be attained, 5290 parts of basic hydrated barium chloride corresponding to $Ba(OH)Cl.2H_2O$ and a mother liquor consisting of 940 parts of NaOH, 1760 parts of NaCl, 120 parts of $Ba(OH)_2$, and 7050 parts of water. The solid and the mother liquor are separated in any convenient manner, e. g., by filtration or centrifuging.

*Step (2)*

To the mother liquor from step (1) are added 75 parts of $Na_2CO_3$, precipitating out 140 parts of $BaCO_3$ which are removed and which by calcination are rendered re-utilisable for addition as oxide or hydroxide to step (1). The mother liquor is now evaporated, resulting in the deposition of 1720 parts of NaCl, which are returned to step (1), and yielding 1000 parts of NaOH as a liquor comprising an approximately 50% solution of NaOH in water, containing about 2% of NaCl. This small salt content may be removed almost completely by treatment with sodium sulphate followed by treatment with sodium carbonate.

*Step (3)*

(a) The 5290 parts of $Ba(OH)Cl.2H_2O$ are stirred at 30° C. with a suitable quantity of water containing 400 parts of $NH_3$, yielding 1400 parts of $Ba(OH)_2$ as one of its hydrates, which are removed and returned to step (1).

(b) To the mother liquor from (a) is added $CO_2$ in amount sufficient to precipitate the barium content as carbonate. 3035 parts of $BaCO_3$ are obtained, yielding on calcination and hydration (which may suitably be effected by the aqueous liquor employed in step (1) 2630 parts of $Ba(OH)_2$ as one of its hydrates. Conveniently, the 3035 parts of $BaCO_3$ obtained above and the 140 parts obtained in step (2) are combined and calcined together. The ammonia may be recovered by known distillation methods from the $NH_4Cl$ solution obtained at the end of this part of step (3).

EXAMPLE 2

The three steps, and the quantities of materials employed, are substantially the same as in Example 1, except that in step (2) no carbonation is employed. In this case, the $Ba(OH)_2$ content (120 parts) of the mother liquor from step (1) deposits with the NaCl (1720 parts) on evaporation and cooling, and the mixture of hydrated $Ba(OH)_2$ and NaCl is returned to step (1). Further, instead of 1000 parts of NaOH, 940 parts of NaOH are finally obtained as an approximately 50% solution in water, containing about 2% of NaCl.

Various modifications of the procedure hereinbefore described may be made in carrying out my invention, and all such modifications are intended to come within the scope of the appended claims in so far as they achieve to a useful degree the various objects hereinbefore disclosed.

I claim:

1. In a process for the manufacture of sodium hydroxide from sodium chloride, the steps which comprise: (1) reacting sodium chloride with barium hydroxide in the presence of a limited amount of water at a temperature not exceeding 40° C., the reactants being present in quantities providing a chloride ion concentration within the range within which basic barium chloride can exist as a stable solid phase, and removing the solid basic barium chloride, formed by the reaction, from the liquor; (2) concentrating the mother liquor from step (1) by evaporation, whereby the relatively small barium content and practically all of the sodium chloride content of the liquor are separated as solids, and removing said solids from the liquor.

2. A process as set forth in claim 1, in which the reaction is carried out in aqueous alcoholic medium.

3. A process as set forth in claim 1, in which the reaction is carried out in aqueous ammoniacal medium.

4. A process as set forth in claim 1, in which at least part of the barium hydroxide is added to said aqueous medium as barium oxide.

5. In a process for the manufacture of sodium hydroxide from sodium chloride, the steps which comprise: (1) reacting sodium chloride with barium hydroxide in the presence of a limited amount of water at a temperature not exceeding 40° C., the reactants being present in quantities providing a chloride ion concentration within the range within which basic barium chloride can exist as a stable solid phase, and removing the basic barium chloride, formed by the reaction from the liquor; (2) concentrating the mother liquor from step (1) by evaporation and then cooling it, whereby the relatively small barium content and practically all of the sodium chloride content of the liquor are separated as solids, and removing said solids from the liquor.

6. A process as set forth in claim 5, in which at least two stages of evaporation are employed in step (2), after each of which the liquor is cooled and the deposited solids are removed.

7. A process as set forth in claim 5, in which flash evaporation of the liquor is employed in step (2).

8. In a process for the manufacture of sodium hydroxide from sodium chloride, the steps which comprise: (1) reacting sodium chloride with barium hydroxide in the presence of a limited amount of water at a temperature not exceeding 40° C., the reactants being present in quantities providing a chloride ion concentration within the range within which basic barium chloride can exist as a stable solid phase, and removing the basic barium chloride, formed by the reaction from the liquor; (2) treating the mother liquor from step (1) with a member of the group consisting of carbon dioxide, sulphuric acid, and relatively soluble carbonates and sulphates to separate at least a portion of its barium content in solid form, removing such solid barium content, then concentrating the mother liquor by evaporation, whereby practically all of the sodium chloride content of the liquor is separated as a solid, and removing said solid sodium chloride from the liquor.

9. A process as set forth in claim 8, in which in step (2) the sodium chloride content of the mother liquor is recovered separately from the barium content and is returned to step (1) of the process.

10. A process as set forth in claim 8, in which in step (2) the mother liquor from step (1) is carbonated prior to evaporation, the resulting barium carbonate being calcined and the barium compound thereby produced being returned to the process.

11. In a process for the manufacture of sodium hydroxide from sodium chloride the steps which comprise: (1) reacting sodium chloride with barium hydroxide in the presence of a limited amount of water at a temperature not exceeding 40° C., the reactants being present in quantities providing a chloride ion concentration within the range within which basic barium chloride can exist as a stable solid phase, and removing the solid basic barium chloride, formed by the reaction, from the liquor; (2) splitting up the basic barium chloride obtained in step (1) into barium hydroxide and barium chloride by treating it with such a quantity of water that the final chloride ion concentration is below the range within which basic barium chloride can exist as a stable solid phase, and that the bulk of the barium hydroxide is undissolved, removing said barium hydroxide, and returning it for use in step (1) at a later stage of the operation.

12. A process as set forth in claim 11, in which the conversion of the basic barium chloride is effected by treatment with aqueous ammonia.

13. A process as set forth in claim 11, in which the aqueous medium remaining after the removal of solid barium hydroxide in step (2) is carbonated, the resulting barium carbonate being calcined and the barium compound thereby produced being returned to the process.

14. A process as set forth in claim 11, in which the aqueous medium remaining after the removal of solid barium hydroxide in step (2) is carbonated in the presence of ammonia, the resulting barium carbonate being calcined and the barium compound thereby produced being returned to the process.

15. In a cyclic process for the manufacture of sodium hydroxide from sodium chloride, the steps which comprise: (1) stirring together barium hydroxide and sodium chloride in aqueous medium at a temperature not exceeding 40° C. for a sufficient time to enable equilibrium to be attained; (2) separating the solids, consisting essentially of basic barium chloride, for the reaction mixture of step (1); (3) adding sodium carbonate to the mother liquor obtained in step (2) and separating the resulting solid barium carbonate; (4) calcining the barium carbonate obtained in step (3) and returning the resulting barium compound to step (1); (5) evaporating the mother liquor obtained in step (3), until the concentration of sodium hydroxide therein is approximately 50 per cent, removing deposited sodium chloride and returning the same to step (1); (6) stirring the basic barium chloride obtained in step (2) with aqueous ammonia for a sufficient time to enable equilibrium to be attained; (7) separating the solids, consisting essentially of barium hydroxide, from the reaction mixture of step (6) and returning said barium hydroxide to step (1); (8) adding $CO_2$ to the mother liquor from step (7) and separating the resulting barium carbonate; (9) calcining the barium carbonate obtained in step (8) and returning the resulting barium compound to step (1).

16. In a cyclic process for the manufacture of sodium hydroxide from sodium chloride, the steps which comprise: (1) stirring together barium hydroxide and sodium chloride in aqueous medium at a temperature not exceeding 40° C. for a sufficient time to enable equilibrium to be attained; (2) separating the solids, consisting essentially of basic barium chloride, from the reaction mixture of step (1); (3) evaporating the mother liquor obtained in step (2) until the concentration of sodium hydroxide therein is approximately 50 per cent, removing deposited barium hydroxide and sodium chloride and returning the same to step (1); (4) stirring the basic barium chloride obtained in step (2) with aqueous ammonia for a sufficient time to enable equilibrium to be attained; (5) separating the solids, consisting essentially of barium hydroxide, from the reaction mixture of step (4) and returning said barium hydroxide to step (1); (6) adding $CO_2$ to the mother liquor from step (5) and separating the resulting barium carbonate; (7) calcining the barium carbonate obtained in step (6) and returning the resulting barium compound to step (1).

IVOR L. CLIFFORD.